Oct. 4, 1949.  A. E. SLAWIK  2,483,943
DRAIN COCK RECEPTACLE
Filed Jan. 4, 1945
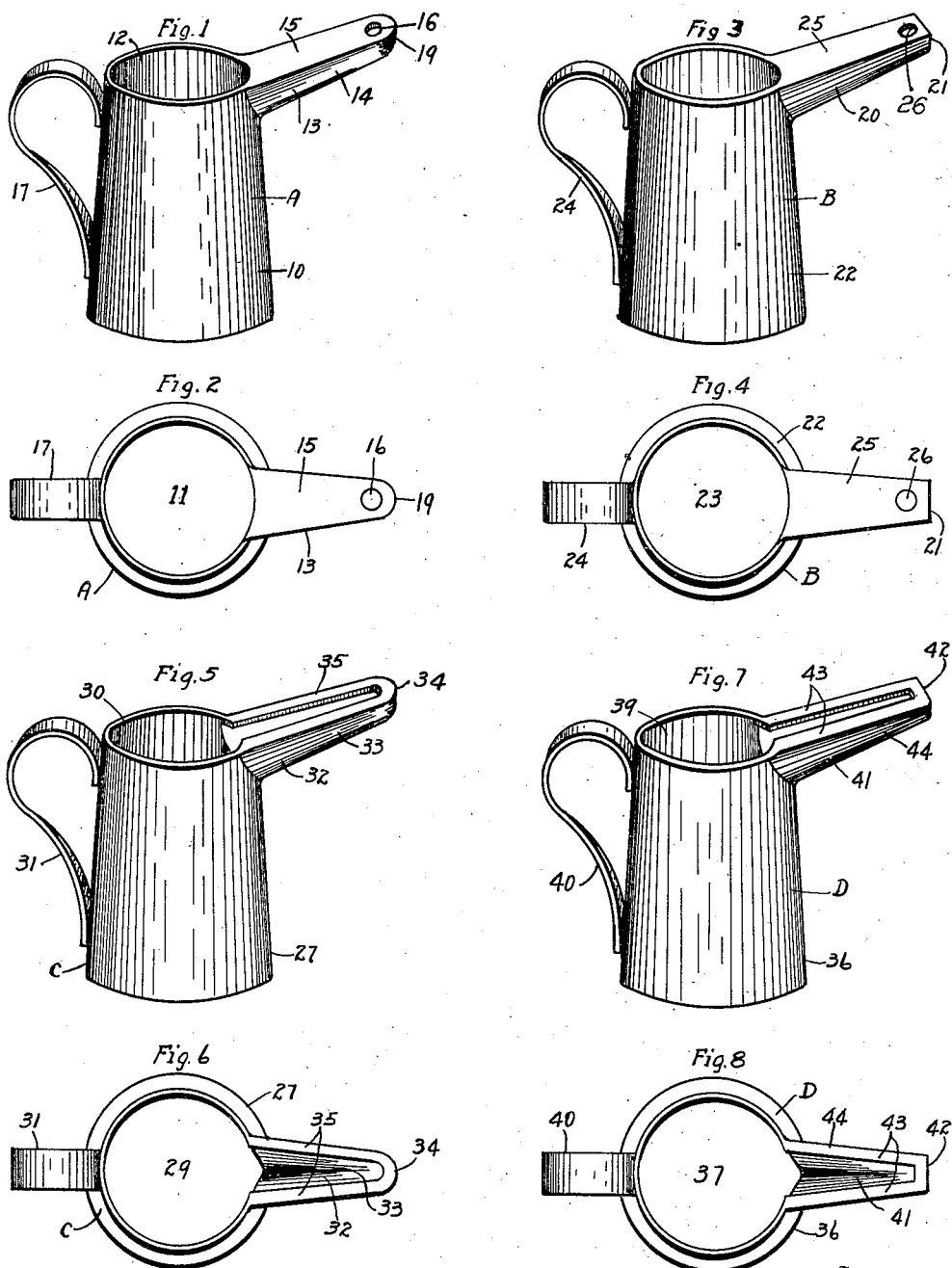
Albert E. Slawik Inventor
By Robert M. Dunning Attorney Patented Oct. 4, 1949

2,483,943

UNITED STATES PATENT OFFICE 2,483,943

DRAIN COCK RECEPTACLE

Albert E. Slawik, St. Paul, Minn.

Application January 4, 1945, Serial No. 571,273

3 Claims. (Cl. 220—1)

My invention relates to an improvement in drain cock receptacle, wherein it is desired to provide a receptacle for receiving fluid emitted from radiator drain cocks or the like.

In the use of hot water heating systems, it is usually necessary to remove air from the system from time to time. Drain cocks are usually provided near the top of each radiator through which air may be removed from the radiator. As there is no warning when the air has been exhausted from the radiator it is desirable to hold some type of a receptacle adjacent the drain to catch whatever liquid is ejected from the radiator before the drain cock can be turned off. Most types of receptacles are not particularly desirable for this use. It is the purpose of the present invention to provide a receptacle particularly adapted for the intended purpose.

The object of the present invention is to provide a receptacle for receiving fluid from radiator drain cocks and the like. This receptacle receives the liquid without permitting the same to splash out of the receptacle, thus confining the liquid even though it is ejected from the radiator with some force. If a cup or similar receptacle is used to catch the drainage the liquid will often times strike the rounded bottom of the cup under force and splash over the opposite side of the cup. With the present receptacle means are provided to retain the liquid to prevent the splashing thereof.

A feature of the present invention lies in providing a receptacle having a spout extending upwardly and laterally from the body thereof so that the end of the spout may be placed beneath the drain cock which might otherwise be relatively inaccessible. Radiators are often placed in corners where the drain cocks are difficult to operate and where it is difficult to insert the usual type of receptacle. The laterally and upwardly projecting spout is designed to remedy this previous difficulty.

A feature of the present invention lies in the provision of a splash guard which covers or partially covers the spout. This splash guard may comprise a closed top on the spout having an aperture therein through which the bottom of the drain cock may extend. While this form of the invention is extremely advantageous the spout could be provided with an inwardly extending splash flange which prevents liquid from splashing from the sides of the spout. This guard or flange prevents the spout from being used as a pouring spout, as the splash flange renders the spout undesirable for pouring purposes.

A further feature of the present invention resides in the provision of a receptacle with a handle on one side thereof and a laterally and upwardly extending spout on the other side thereof. As a result the spout may be accurately positioned beneath the drain cock before the drain cock is opened to emit air and liquid.

These and other objects and novel features of my invention will be more clearly and fully set forth in the following specification and claims.

In the drawings forming a part of my specification:

Figure 1 is a perspective view of a receptacle embodying the principles of my invention.

Figure 2 is a top plan view of the receptacle shown in Figure 1 of the drawings.

Figure 3 is a perspective view of a receptacle similar in most respects to the receptacle shown in Figures 1 and 2, with the exception that the spout is provided with a square end rather than a rounded end.

Figure 4 is a top plan view of the receptacle illustrated in Figure 3.

Figure 5 is a perspective view of a modified form of receptacle construction.

Figure 6 is a top plan view of the receptacle shown in Figure 5.

Figure 7 illustrates a modified form of the receptacle shown in Figures 5 and 6.

Figure 8 is a top plan view of the receptacle shown in Figure 7.

The radiator drain cock receptacle A, illustrated in Figures 1 and 2 of the drawings, includes a hollow tubular body 10 which may, if desired, be of larger diameter at its base than at its top as illustrated. A bottom 11 is provided in the receptacle A, and the top of the receptacle is preferably open as indicated by the numeral 12.

Projecting laterally and upwardly from the body 10 at a point adjacent the open top 12 thereof, I provide a spout 13. This spout may be substantially rectangular in outline or may be trough-shaped in section as illustrated. The spout includes the trough-shaped body 14 and a closed top 15. Access to the interior of the spout is obtained through a relatively small aperture 16 near the end of the spout, but spaced from the extreme end thereof. The aperture 16 is of sufficient size to receive the lower part of a radiator drain cock. As the aperture is spaced from the walls of the trough-shaped spout the liquid may not easily splash out of the trough once it is discharged thereinto from the drain cock.

It will be understood that the fluid is usually discharged into the spout with some force and this force might be sufficient to cause the fluid to splash out of the spout were it not that the splash guard formed by the closed top 15 prevents such splashing. Thus while the receptacle A is not as efficient as a pouring receptacle, due to the spacing of the aperture 16 from the end and side walls of the spout, the receptacle forms an effective apparatus for receiving fluid.

A handle 17 is provided on the body 10 at a point diametrically opposed from the spout 13. This handle permits the easy manipulation of the receptacle for its intended purpose. The fluid which is received in the receptacle A is preferably discharged by pouring the same over the side of the receptacle although most of the liquid may be drained through the aperture 16 by completely inverting the receptacle.

The receptacle A, shown in Figures 1 and 2 of the drawings, is provided with a spout 13 having a rounded extremity 19. While such a rounded spout end has certain advantages, it is not entirely essential to the present invention. In Figures 3 and 4 of the drawings I disclose a receptacle B which is identical with the receptacle A, except that the spout 20 of the receptacle B is provided with a square end 21 in place of the rounded end 19 of the spout 13.

The receptacle B is provided with a hollow wall portion 22 having a closed bottom 23 which may be supported by a handle 24. The top of the body 22 is preferably open and the spout 20 is secured to the body adjacent this open top. The spout 20 is preferably provided with a closed top 25 having an aperture 26 therein of sufficient diameter to receive the lower end of a radiator drain cock. The closed spout top 25 acts as a splash guard to prevent fluid from splashing out of the spout when fluid is discharged under pressure into the aperture 26.

In Figures 5 and 6 of the drawings I disclose a receptacle C which differs slightly from the previously described construction. The receptacle C includes a hollow upright tubular body 27 having a closed bottom 29 and an open top 30. A handle 31 is provided on the body 27 and a spout 32 projects laterally and upwardly from the body 27 in opposed relation to the handle 31. The spout 32 is positioned at the top of the body 27 near the open end 30 thereof, and the spout includes a trough-shaped member 33 terminating in a rounded extremity 34. A splash guard in the form of an inturned flange 35 extends inwardly from the upper extremity of the trough shaped body 33, leaving a slot between opposite sides of the flange into which the lower end of a radiator drain cock may extend. The splash guard 35 acts to prevent fluid received therein from being splashed out of the spout when the fluid enters the same under some pressure.

In Figures 7 and 8 of the drawings I disclose a receptacle D, similar in general to the receptacle C illustrated in Figures 5 and 6. The receptacle D includes a top body 36 having a closed bottom 37 and an open top 39. A handle 40 is mounted on the body 36 by means of which the receptacle may be manipulated. A spout 41 is secured to the body 36 in opposed relation to the handle 40, the spout 41 extending laterally and upwardly from the upper open end 39 of the receptacle.

The spout 41 is trough-shaped in cross section and terminates in a square end 42. It is in this square end 42 that the receptacle D differs from the receptacle C. A flange 43 extends inwardly from the edges of the trough-shaped spout body 44 forming a part of the spout 41. This flange 43 acts as a splash guard to prevent liquid entering the spout under considerable pressure from being splashed out of the spout.

It is obvious that the receptacles described would be relatively inefficient for pouring purposes, and preferably the contents of the receptacle are emptied by pouring the contained liquid over the side of the receptacle body at its open top, rather than through the spout. The spout, however, is ideal for receiving liquid entering the same under pressure, and the splash guard provided acts to prevent the splashing of liquid from the spout.

In accordance with the patent statutes, I have described the principles of construction and operation of my drain cock receptacle, and while I have endeavored to set forth the best embodiments thereof, I desire to have it understood that obvious changes may be made within the scope of the following claims without departing from the spirit of my invention.

I claim:

1. A radiator drain cock receptacle comprising a hollow tubular body having a closed bottom, a spout extending laterally and upwardly from said body, said spout including a trough-shaped body relatively shallow throughout its length and having a closed outer end, a closure plate extending over said trough-shaped body, and an aperture in said closure plate spaced from the edges of said trough-shaped body and said closed end.

2. A radiator drain cock receptacle comprising a hollow tubular body having a closed bottom, a spout extending laterally and upwardly from said body, said spout comprising a trough-shaped body relatively shallow throughout its length and having a closed rounded end, a splash guard extending inwardly from the upper edges of said trough-shaped body and said closed end, said splash guard having a recess therein spaced from the edges thereof and suitable for accommodating the lower end of a radiator drain cock.

3. A radiator drain cock receptacle comprising a hollow tubular body having a closed bottom, a long narrow spout trough-shaped in cross section and relatively shallow throughout its length projecting from said body adjacent the upper end thereof, the bottom of said trough-shaped spout terminating at a point substantially spaced from the bottom of the body, and a splash guard on said spout comprising a flange extending inwardly from the side edge of the trough-shaped spout body throughout the entire length of the edge thereof, said flange having an opening therein for reception of a drain cock.

ALBERT E. SLAWIK.

REFERENCES CITED

The following references are of record in the file of this patent:

UNITED STATES PATENTS

| Number | Name | Date |
|---|---|---|
| 425,400 | Boles | Apr. 15, 1890 |
| 644,997 | McCarthy | Mar. 6, 1900 |
| 1,802,426 | Hoyt | Apr. 28, 1931 |
| 2,015,015 | Hothersall | Sept. 17, 1935 |
| 2,022,342 | Drood | Nov. 26, 1935 |
| 2,226,105 | Gillespie | Dec. 24, 1940 |